United States Patent [19]

Kurtz

[11] 4,192,005
[45] Mar. 4, 1980

[54] COMPENSATED PRESSURE TRANSDUCER EMPLOYING DIGITAL PROCESSING TECHNIQUES

[75] Inventor: Anthony D. Kurtz, Englewood, N.J.
[73] Assignee: Kulite Semiconductor Products, Inc., Ridgefield, N.J.
[21] Appl. No.: 853,219
[22] Filed: Nov. 21, 1977
[51] Int. Cl.² ............................................. G06F 15/20
[52] U.S. Cl. ..................................... 364/571; 364/558; 73/765; 73/766
[58] Field of Search ............... 364/508, 558, 571, 573, 364/581, 582; 73/88.5 SD, 345; 338/3

[56] References Cited

U.S. PATENT DOCUMENTS

| | | | |
|---|---|---|---|
| 3,781,869 | 12/1973 | Sudnick et al. | 364/508 X |
| 3,790,910 | 2/1974 | McCormack | 364/573 X |
| 3,913,392 | 10/1975 | Nagase et al. | 73/88.5 SD |
| 3,958,108 | 5/1976 | Shimomura | 364/573 X |
| 4,031,630 | 6/1977 | Fowler | 364/571 X |

Primary Examiner—Jerry Smith
Attorney, Agent, or Firm—Arthur L. Plevy

[57] ABSTRACT

A semiconductor sensor configuration employs piezoresistors arranged in a bridge configuration. A memory has stored therein at predetermined locations, values indicative of error voltages associated with the particular bridge circuit due to undesireable variations of temperature and pressure. The bridge circuit is coupled to digital processing circuitry which serves to access the memory at desired locations to retreive the values stored and to process these values in order to compensate the output signal supplied by the bridge during operation to provide a compensated output signal truly determinative of the applied pressure as being compensated for the particular error signals as stored in the memory.

It is also understood that the above described technique has applicability in compensating other sensor configurations which employ non-semiconductor strain gages.

10 Claims, 1 Drawing Figure

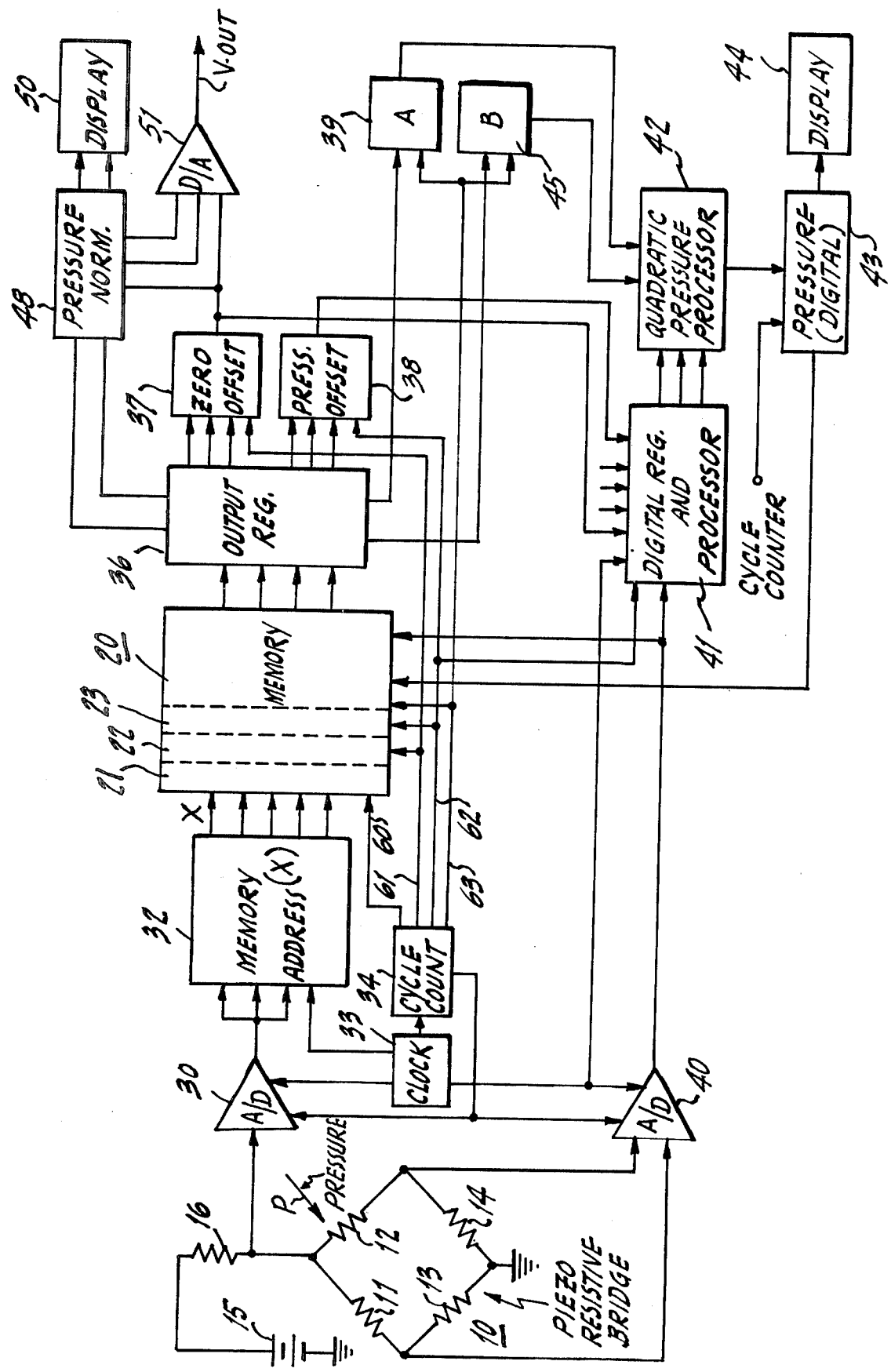

COMPENSATED PRESSURE TRANSDUCER EMPLOYING DIGITAL PROCESSING TECHNIQUES

BACKGROUND OF INVENTION

The semiconductor pressure transducer has acheived widespread use in a variety of applications involving the medical, aerospace and automotive industries. The high output obtainable from semiconductor transducers employing piezoresistive sensing elements have specified their use in a wide range of applications and structures. These factors together with constant improvement in integrated circuit technology, have allowed the design of ultraminiature transducers which are capable of operating in very diverse environments.

It is, of course, known that a major problem in regard to these devices is the problem of compensating the transducer for changes both in temperature and pressure. As is known, the gage factor and resistivity of the sensor varies with temperature. In order to construct a transducer whose output and zero unbalance are essentially independent of temperature, the temperature coefficient of gage factor and resistance should be maintained as low as possible. In practice, it is extremely difficult if not virtually impossible to maintain a gage factor independent of temperature. Hence, the prior art transducers employ compensating techniques which are integrally associated with the sensor configuration. A usual method for output compensation utilizes the increase of bridge resistance to offset the decrease of gage factor with temperature. Hence, in such applications, it was important that the temperature coefficient of resistance over the entire range of interest be positive and somewhat larger than the decrease of gage factor with temperature.

In order to compensate for such effects, many circuits and techniques were devised to add external resistors to the bridge circuit in order to control the output of the bridge according to temperature. Typical techniques employed a plurality of resistive elements which, if properly arranged, would provide a temperature compensated transducer. See, for example a patent entitled TEMPERATURE COMPENSATED SEMICONDUCTOR STRAIN GAGE UNIT, U.S. Pat. No. 3,245,252 issued on Apr. 12, 1966 to David J. First, Anthony D. Kurtz and Jean-Pierre A. Pugnaire. In any event, typical techniques to compensate strain gage transducers may require the addition of eleven or more external resistors to provide temperature compensation.

It is thus apparent that apart from the difficulty in compensating such structures, is the further difficulty that the components used to compensate the bridge characteristics can also vary and change according to temperature or with time. Hence, such devices are continuously monitored to assure proper calibration with temperature.

Apart from the temperature problems as described above, is the further problem that the semiconductor transducer or bridge configuration further exhibits non-linearities due to applied pressure. Hence, even under the conditions of constant temperature, there is a variation in output due to pressure. This variation is in part due to the particular construction of the pressure responsive diaphragm as well as the construction techniques for fabricating the individual sensors. This variation of the output of the transducer with respect to pressure, as indicated, is not related to the temperature changes and does not vary according to the same relationship as governing the changes in temperature. Hence, the manufacturer must further account for such variations in output which are due strictly to the variation in pressure.

There are also techniques which employ compensating resistors in conjunction with temperature compensating components to attempt to compensate for the pressure effect.

Essentially, the problem in transducer output of pressure is that a transducer should ideally provide a linear voltage for applied pressure. For example, if a transducer provides one volt for one psi pressure, it should provide a half a volt for one-half psi pressure. In practice, the units do not do so and exhibit a definite variation according to applied pressure. Thus, as above indicated, this nonlinearity or variation is further compensated for by the use of external components and involves additional time and expense in production.

The problem of compensating a transducer is, of course, initially imposed upon the manufacturer of such devices who must assure that the units will operate according to specifications.

Hence, by using the above described techniques, the units produced are individually compensated during production. These techniques require an extensive amount of time and are implemented by relatively skilled workers. Such considerations, of course, are indicative of the price at which extremely accurate and highly calibrated pressure transducers are sold at.

It is therefore an object of the present invention to provide an improved pressure transducing structure employing digital circuitry capable of automatically and continuously compensating for temperature and pressure variations in such transducers. The techniques and structure to be described are applicable in general to provide automatic compensation for such transducing devices to thereby substantially reduce the above described production procedures presently employed in the transducer art.

BRIEF DESCRIPTION OF PREFERRED EMBODIMENT

A pressure transducer of the type employing semiconductor sensor elements capable of providing a change in resistance according to the magnitude of an applied pressure, said elements when biased, undesireably providing specified error voltages due to variations inherent in said elements as fabricated, comprising:

(a) memory means having stored at predetermined address locations, values indicative of said undesired error voltages, (b) means for generating a code indicative of one of said predetermined memory address locations, (c) means for applying said code to said memory to access a value indicative of said undesired error voltage, (d) means for applying a pressure to said semiconductor sensor elements to cause the same to provide a change in resistance according to said pressure, including means coupled to said sensor elements to provide a signal indicative of said pressure, (e) logic means responsive to said signal and said value indicative of said error voltage to compensate said signal according to the magnitude of said value as stored to provide at an output, a compensated signal indicative of said applied pressure and relatively independent of said error voltage.

BRIEF DESCRIPTION OF THE SOLE FIGURE

The sole FIGURE is a block diagram partially in circuit form of a transducer structure employing digital techniques and operating according to the invention.

DETAILED DESCRIPTION OF DRAWINGS

Before proceeding with a description of the block diagram, it is to be noted that the functions to be described can be implemented by the use of a microprocessor in conjunction with a suitable program. In this manner, the discussion of the FIGURE will be described in general terms in order to define the specific requirements for implementing the structure by the use of a microprocessor unit and a software program. It is, of course, understood that the apparatus depicted is completely capable of being implemented by using conventional integrated circuit components in lieu of a generalized computer system.

Referring to the FIGURE, reference numeral 10 depicts a Wheatstone bridge array comprising resistors 11-14. Resistors 11-14 may be piezoresistive semiconductor elements which are deposited or diffused on a suitable diaphragm such as silicon and which exhibit a change in resistance according to an applied pressure or force on the diaphragm.

As is conventional in such bridge arrays, two of the resistors are positioned so that they are subjected to a tensile force, while the other two are subjected to a compressive force. This aspect of operation in piezoresistive bridge configurations is well known in the art and suitable examples of such bridge circuitry as well as operation of the same can be had by referring to U.S. Pat. No. 3,654,579 entitled ELECTROMECHANICAL TRANSDUCERS AND HOUSINGS issued on Apr. 4, 1972 to the Assignee herein.

Thus, in such a bridge configuration, resistors as 11 and 14 would be subjected to a tensile force, while resistors as 12 and 13 would be subjected to a compressive force. Generally speaking, total impedance of the bridge does not change with the application of a pressure as two resistors go up in value, while two go down in value. It is, of course, understood that the ratio of resistance between opposing arms of the bridge does change in accordance with pressure and that is how the bridge serves to monitor pressure by supplying a voltage at its output proportional to the same.

The bridge configuration 10 is biased by a battery or source of reference potential 15 via a current limiting resistor 16. There are, of course, numerous ways of applying the operating potential to the bridge and the configuration shown herein is indicative of one approach.

For purposes of the present explanation, it will be assumed that the voltage source 15 is relatively constant and hence, does not vary according to the load. The assumption is quite practical and there are many ways of providing a biasing scheme for such a bridge which supplies a constant voltage.

As briefly indicated above, a semiconductor bridge such as 10 has inherent variations which are manifested in regard to both temperature and pressure changes. It is such variations that are compensated for during the prior art production procedures and account for a great deal of production time to properly compensate for the same. In order to fully describe the compensating techniques afforded by the apparatus depicted in the figure, each of these variations will be separately described and the compensation for the same indicated.

Basically, there are five major errors which are compensated for by external means in the transducer art. These errors are as follows:

1. There is an unbalance in the transducer output with no applied pressure. This unbalance is due to the fact that the typical bridge configuration which comprises four resistors has an inherent unbalance due to the difficulty in fabricating identical resistors in opposing arms of the bridge. Hence, as one can ascertain, there is an unbalance in the bridge circuit with no applied pressure based on these considerations.

2. There is an additional error which exists even if the resistors as indicated above, are perfectly balanced. This error is an unbalance of the zero condition with no applied pressure as a function of temperature. Essentially, this error is due to the fact that the temperature coefficients of the individual resistors in the bridge may vary differently with temperature and hence, the prior art had to compensate for the zero output variation over a given temperature range.

3. There is a further error which is a voltage output variation at room temperature with the application of a reference pressure to the transducer. This variation is indicative of the bridge providing a different voltage output upon application of a given pressure to the bridge at the same temperature. For example, a given bridge configuration will then provide a different voltage at the same temperature and at the same reference pressure. This effect must also be compensated for in order to assure that the bridge does, in fact, provide the same voltage output for the same applied pressure at the same temperature.

4. A further variation is, as above indicated, in that the bridge will provide a different voltage output for an applied pressure over a range of temperatures. This effect is different than the above noted zero shift effect with temperature and is related to gage factor but presents the following problem: A given bridge configuration with the application of an applied reference pressure will provide after compensation, a given voltage output at a given temperature as described in regard to paragraph 3. However, this voltage output will vary over a range of temperatures and hence, this is to be compensated for.

5. The fifth variation is indicative in a nonlinear output which varies according to the magnitude of an applied pressure. Essentially, the bridge should provide a linear output according to applied increments of reference pressure. Hence, for an applied reference pressure of one psi, the output signal for example, may be one volt. Hence, one would desire that for an applied pressure of two psi, the output voltage would be two volts. This will not occur and this variation, as will be explained, is not linear but follows a definite relationship. Hence, this non-linearity must also be compensated for.

Basically, the problem to be solved is that all transducers of a given class should have the same output per unit of pressure after they have been adequately compensated. In this manner, any one of a plurality of transducers which purportedly have the same diaphragm size and the same resistive coefficients associated with the sensors should provide the same output per unit of pressure over the desired pressure and temperature range that the transducer is specified for.

As briefly indicated above, this is not the case and hence, each transducer in the class has to be separately compensated in regard to the above factors.

It is therefore a main objective of the present invention to describe a means for automatically and accurately compensating for each of the above effects by storing values indicative of the error voltage of each transducer in regard to the above noted problems to assure that all transducers of a given class will perform accordingly.

For purposes of explanation of the invention, it is understood that the problems indicated in categories 1 and 2 are similar and will be described as a voltage output shift with temperature and zero pressure. The problems depicted in categories 3 and 4 are also similar and will be described as output variation of an applied reference pressure according to temperature; while the problem depicted in paragraph 5 will be discussed as a variation in voltage output as a function of reference pressure increments.

It is also understood that while the above noted variations are indicative of semiconductor pressure sensors such as piezoresistive devices, other types of sensors such as metal, foil sensors as well as other type of strain gages exhibit similar problems in regard to temperature and/or pressure and hence, the technique of compensating such devices by storing values in a memory indicative of such errors and by operating upon such values in a pressure environment, are applicable to these other types of sensors as will be ascertained by one skilled in the art.

VOLTAGE OUTPUT SHIFT WITH TEMPERATURE AND ZERO PRESSURE

A semiconductor bridge such as 10 exhibits a zero offset which essentially is a voltage output at a zero pressure level. Thus, the bridge 10 will provide a voltage at the output at a given temperature, even though a pressure is not applied. This, of course, is due to inherent unbalances relating to the individual resistors as fabricated on the pressure transducing diaphragm and so on. In normal production techniques, this voltage is compensated for by balancing the bridge using external components so that the output is zero for zero pressure applied.

In any event, the zero offset of the bridge 10 is also a function of temperature and hence, with the application of zero pressure to the bridge, the voltage output varies as the temperature varies. This variation is relatively linear over a fairly large temperature range and one can approximate the variation by a straight line of a specific slope.

Also shown in the FIGURE is a memory module 20. The memory 20 is a typical integrated circuit array; many examples of which exist in the prior art and have been used extensively in calculators and so on. The memory 20, as is known, has a plurality of storage locations; each of which is capable of being accessed by applying a suitable address to the input terminals. In this manner, the memory 20 has a particular set of locations 21 which are reserved to store information concerning the zero offset characteristics of the particular transducer configuration 10. Hence, the memory 20 has stored therein at locations 21, digital numbers indicative of the zero offset voltage of the particular transducer as measured during a temperature cycle. For example, the transducer 10 would be subjected to variations in temperature with zero pressure. The output voltage obtained would be stored in memory for each temperature increment and hence, one would then have stored in locations 21, a value of offset for the transducer indicative of the temperature.

It is also understood that due to the fact that the variation is linear, one could store the slope of the curve in location 21 and hence as will be explained, by knowing the temperature, one can then solve a straight line equation for voltage. Hence, as indicated above, there exists a section of the memory 21 at which addresses are stored, a number or numbers indicative of the zero offset with the particular transducer as measured after production. These numbers are automatically converted to digital form and applied to a memory module 20 which is inherently associated with the transducer configuration 10.

OUTPUT VARIATION OF AN APPLIED REFERENCE PRESSURE ACCORDING TO TEMPERATURE

Another variation inherent in a bridge configuration as 10 is the variation of the voltage output with a reference pressure applied thereto. This variation is also a function of temperature. For example, a given bridge configuration as 10 will exhibit a given output voltage with the application of an applied pressure. This output voltage will also vary with temperature and the variation is not the same as the variation of a zero pressure as above described.

In any event, this variation also varies in a relatively linear relationship, but possesses a different slope than the zero offset. In a similar manner, a section 22 of the memory 20 is reserved to store values indicative of this variation of an applied reference pressure.

Again, as above indicated, the bridge configuration 10 would be subjected to a reference pressure of say one hundred psi and the voltage output would be measured and stored at various temperatures in memory locations 22. As above indicated, one can store three or more points for three unique temperatures in memory locations 22 or store the value of the slope of the line which corresponds to the particular transducer configuration 10. Accordingly, if the slope were stored, one would then solve for the output voltage by knowing the temperature as will be explained. Accordingly, memory location 22 has received and has stored therein at suitable addresses, the value or numbers indicative of the voltage variation of the bridge with a reference pressure applied thereto and according to temperature.

VARIATION IN VOLTAGE OUTPUT OF BRIDGE AS A FUNCTION OF REFERENCE PRESSURE INCREMENTS

There is a further variation associated with a piezoresistive sensor arrangement as 10 which essentially manifests itself in a nonlinear output according to the magnitude of an applied pressure. For example, the bridge circuit shown may operate to provide an output voltage for example, of one volt for an applied reference pressure of one psi. In this manner, the bridge should provide an output of one-half volt for an applied reference pressure of one-half psi. A typical piezoresistive bridge arrangement which is not compensated will not do this and will not provide a linear output according to applied increments of reference pressure. This variation is not linear but is of the following relationship:

$$Y = AP + BP^2$$

where Y equals the voltage output of the bridge 10; P equals pressure applied; A is a constant which is a function unique to the particular bridge configuration 10 and B is another constant which is particular to the bridge configuration 10.

Hence, there is stored in memory at locations 23, information indicative of the voltage output of the bridge as measured or derived from increments of pressure. For example, the information stored in memory location 23 is obtained by applying a reference pressure to the bridge and then measuring the voltage output and this value may be stored in a first memory location associated with section 23 of the memory.

Next, a pressure equal to eighty percent of the reference pressure is then applied and this voltage is stored in the next location. A pressure of sixty percent is then applied and this voltage is stored in the next location and so on.

As one can ascertain, by knowing the voltage provided at various reference pressures and by knowing the reference pressure applied, one can then solve for the values of A and B which are the constants associated with and unique to the particular bridge configuration 10. These constants A and B can be stored in memory locations 23 as being indicative of this particular bridge or, as will be explained, one might desire to store the actual digital representations of the voltages which the bridge provided upon the application of the various pressures as above described. Accordingly, memory locations 23 have stored therein, values representative of the constants A and B associated with the deviations of the bridge according to fixed increments of pressure.

It is, of course, understood that the above described information is preprogrammed or prestored into the memory module 20 after formation of the particular bridge arrangement 10. It is, of course, noted that techniques for implementing such information in a memory are well known in the state of the art and can be accomplished and accommodated by automatic equipment which will completely control temperature cycling and voltage measurements to monitor and thereafter store such information in a memory module such as 20.

It is, of course, immediately apparent that the measurements which have been described above can be done by hand and the memory locations can also be so accommodated.

In regard to the above noted description of the transducer variations as well as the implementation of memory, a discussion of an embodiment of apparatus for a transducer system employing digital processing techniques will now be described.

As indicated above, a resistor 16 is in series with the bridge and is coupled between the bridge 10 and a source of constant potential 15. Essentially, the impedance of the bridge does not change during the application of pressure and the current through the bridge does not change according to the application of pressure. However, the impedance of the bridge does change according to temperature and hence, the voltage across resistor 16 varies according to temperature.

Shown coupled to resistor 16 is an analog to digital converter 30. The A/D 30 essentially is a well known component and serves to convert voltage across resistor 16 to a digital signal. This signal is completely indicative of temperature and changes according to the temperature at which the bridge circuit is operating at. There are, of course, many ways of monitoring the bridge temperature as by using an additional resistor which may be mounted or located on the same substrate as resistors 11-14 as well as many other techniques known in the art for monitoring the temperature of the bridge array 10.

The output of the A/D converter 30 is coupled and directed to a memory address register 32; which register 32 accesses input lines to the memory to select a series of locations having a particular X address and at which preprogrammed information is stored.

Also shown coupled to an input of A/D 30 is an output of a clock circuit 33. Clock circuit 33 is a typical timing generator which may be a crystal controlled astable multivibrator and operative to provide a timing waveform in order to synchronize and control the operation of the digital circuitry to be described. In this manner, the output digital signal from the A/D converter 30 is synchronized according to the master clock circuit 33 which also controls the sequence of information into the memory address register 32.

Also shown coupled to the clock circuit 33 is a cycle counter 34. The cycle counter 34 essentially is a binary counting circuit which produces an output of a predetermined duration according to a number of clock pulses from the clock circuit 33. As will be described, the cycle counter 34 has three outputs connected to the memory 20; which outputs energize Y lines of the memory to thus enable the memory to provide information stored in an X,Y address as determined by the data impressed on the memory via the address register 32 and the cycle counter 34. The memory has its output data lines conventionally coupled to an output register 36. The register 36 functions to store the information contained in a memory address as accessed by the system during a particular cycle.

Coupled to the output register 36 is a zero offset register 37 and a pressure offset register 38. Registers 37 and 38 are shown as separate modules and as will be explained, could be combined with the output register 36 or a single register may be employed to provide the requisite data.

Also coupled to the output register 36 are two additional storage modules 39 and 45 designated as A and B; which modules operate to store or respond to the value of the constants A and B as retreived from the memory 20.

The output of the bridge 10 is coupled to an analog to digital converter 40; which converter 40 essentially converts the analog voltage emanating from bridge 10 to a digital signal. This digital signal is applied and stored in a digital register and processing circuit 41. Hence, the register 41 contains an output indicative of the digital value of the voltage provided by bridge 10 during operation. The output of the digital register 41 is applied to the input of a quadratic pressure processor 42. The pressure processor 42 also has inputs coupled to registers 39 and 45 associated with the A and B constants.

The function of the quadratic pressure processor, as will be explained, is to provide an output which solves the quadratic equation for pressure by operating on the digital value of the voltage output of the bridge 10 and with constants A and B to solve the equation indicative of the bridge variation according to pressure increments. In this manner, the output of the quadratic pressure processor is applied to a register 43 which is a digital indication of the pressure obtained by solving the above noted equation: $Y = AP + BP^2$ The output of the pressure register 43 is applied and directed back to the memory 20 where, as will be explained, it is stored and normalized. One can also, of course, provide a display 44 of the contents of the register 43, if desired.

Also shown is a register 48 connected to the output register 36. The register 48, as will be explained, stores a digital value of the pressure output for the transducer as completely compensated for the above described effects; which in essence, is a pressure value completely independent of the above noted variations and which is essentially a true compensated value of pressure.

The output of register 48 can be directly displayed by means of a digital display 50 to give a user a true digital indication of the true pressure value as applied to the bridge 10.

A digital to analog converter 51 is coupled to the pressure register 48 to give one an analog voltage labelled V OUT which in essence, is a completely compensated voltage free of all the above described variations and substantially determinative of the actual value of applied pressure as compensated for by the above described circuit.

THEORY OF OPERATION

The sequence of operation of the apparatus depicted in the FIGURE will now be described based on the above noted circuit components.

Essentially, the bridge circuit 10 after production, is subjected to measurements described above and the appropriate values stored in memory. The bridge circuit 10 is completely uncompensated in regard to any existing configurations or prior art compensating techniques and the circuit together with the associated components may be fabricated by conventional integrated circuit techniques as presently employed in the microprocessor or calculator art.

It is noted that the entire processing circuitry apart from the bridge configuration 10, can be separately implemented on an integrated circuit chip by using LSI or other conventional techniques and the bridge configuration fabricated according to prior art considerations as, for example, described in the above noted patent.

As indicated, the cycle counter 34 provides a series of outputs which are indicative of a series of cycles or operations which the unit is to perform.

FIRST CYCLE

During a first cycle, the output 60 of cycle counter 34 is energized. The A/D converter 30 loads the memory address register 32 with a digital value indicative of the temperature that the transducer is subjected to. For purposes of this explanation, it will be assumed that the bridge configuration 10 has applied a pressure P thereto, which pressure is unknown and is to be measured. Thus, the memory address register 32 has a unique address stored therein definitive of an X location. The cycle counter also has output 60 directed to the Y address line of the memory or to that Y address line associated with storage locations 21. The memory 20 during this cycle, transfers the information stored in the XY location to the output register 36. This information, as indicated above, is indicative of the zero shift characteristics of the bridge circuit 10. It is known that this value is an offset value which must be subtracted or compensated for at the output of the bridge circuit 10. The digital value of the offset as obtained and available in register 36 is transferred to register 37 or may be directly transferred to the digital register and processor 41. Register 41 has stored therein the digital value of the voltage output of the bridge 10 as obtained from the A/D converter 40 associated with the bridge 10. During the first cycle, the zero offset value as stored in memory is subtracted from the digital value of the voltage output of the bridge. Hence, after cycle one, the digital register and processor has stored therein, a value indicative of the bridge voltage less the zero offset.

SECOND CYCLE

After completion of the first cycle, the cycle counter advances one count to provide an output on line 61. This output then accesses a different Y line associated with memory 20 and memory 20 thus transfers information located in the storage location 22 associated with the new address. This information, as indicated, is indicative of the voltage variation due to applied pressure as a function of temperature. This value is transferred to the pressure offset register 38. It is noted that in a typical transducer, this variable may decrease with increasing temperature. In any event, the memory has stored therein both the magnitude and the value of the error. In a similar manner, the contents of the pressure offset register 38 is transferred to the digital register and processor 41 and the digital voltage indicative of the transducer output as modified during cycle 1 is now modified according to the pressure offset value contained in register 38 and hence, at the end of cycle 2, the register 41 has stored therein a digital number indicative of the voltage of the transducer as compensated by both zero offset and pressure offset.

THIRD CYCLE

At the completion of cycle 2, the cycle counter advances to the next count and lead 62 is energized, thus selecting the Y lines associated with storage section 23. In this mode, the prestored constants A and B are transferred respectively to registers 39 and 40. The digital register 41 transfers its contents in parallel to the quadratic pressure processor 42. The quadratic pressure processor 42 also recieves the contents of registers 39 and 40. Essentially, the function of the quadratic register and processor 42 is to solve the quadratic equation: $Y = AP + BP^2$. The module has the value of Y stored therein and the values of A and B and thus can solve the quadratic equation as is well known in the digital art, to provide a positive and negative root for pressure. It is, of course, known that a negative pressure is not considered and hence, the positive value is indicative of the true pressure as solved by processor 42. This value is then transferred to register 43 which therefore contains during the cycle 3, a digital value of the true pressure P as applied to the bridge configuration 10 completely compensated for zero offset, pressure offset and incremental pressure variations.

FINAL CYCLE

At completion of cycle 3, the cycle counter advances to the next count and lead 63 is energized which permits access to another Y input line and to another address. Once the pressure is obtained, it is desireable to normalize the pressure so that the transducer will provide one particular value at the output for each computed applied pressure as contained in register 43. Thus, the memory has stored in the XY locations as accessed during the final cycle, normalized values of pressure which correspond to the digital pressure 43 as computed. The reason for this is that one would desire to acheive a single reading indicative of applied pressure according to temperature. As indicated, the X lines are accessed as a function of temperature and hence, the Y locations as selected by the cycle counter have stored therein, normalized pressure values associated with that particular temperature to provide a final reading to enable one to eliminate or reduce any effects of hysterisis which may occur in transducer operation. Hence, during the final cycle, the memory searches the X,Y locations for a normalized value indicative of the computed pressure 43. This value is transferred to the output register 36 and thence, to register 48 where it may be displayed in digital form or converted by the D/A converter 51 into an analog voltage which is the output voltage supplied to the user. It is, of course, understood that the analog voltage V OUT is completely compensated for all the above described variations.

It is, of course, now seen that the above apparatus will perform accordingly completely independent of transducer configuration 10 as coupled to the circuit. Hence, one merely has to wire or connect the transducer as shown in the FIGURE to the processing circuit described above assuring that the circuitry as associated therewith, has the values obtained during production stored at the various locations in the memory 20.

It is thus apparent that the entire circuit and apparatus as thus depicted can be implemented completely by a microprocessor which are available in present day technology. Essentially, the microprocessor contains a program counter which is analogous to the clock and cycle counter 33 and 34 described above. The microprocessor further contains a memory address register which is analogous to the register 32 and the Y access register or Y lines associated with memory 20. The output register 36 which may include registers 37,38 and 48 is completely analogous to the memory data register associated with the microprocessor. In an microprocessor, there is an instruction register which in essence, is programmable and works in conjunction with an arithmetic unit or accumulator to direct the solution of various equations or algorithms which are programmed and stored in memory. It is thus seen that the solution of both the quadratic pressure equation as implemented by module 42 as well as the subtraction or addition of values to the processor 41 is well within the operating characteristics of present day microprocessors and hence, the entire sequence as implemented by the above described circuitry can be programmed and solved by a conventional microprocessor unit as available through many sources. An example of a suitable microprocessor which may be incorporated to perform according to the above constraints is manufactured by Texas Instruments Inc. of Dallas, Texas as Model No. LCM 1001 or by Motorola Semiconductor Products as the Model No. MC 6800.

It is, of course, understood that the use of a memory as above described provides a transducer user or manufacturer with additional space and location to compensate for various other nonlinearities which may be inherent in the formation or construction of such bridge arrangements as 10. Hence, based on the above considerations, a manufacturer in conjunction with the above described techniques, is provided with a great deal of leeway in regard to manufacturing procedures as the completed history of operation of a single transducer as well as its offsets or variations in operation can be stored and compensated for as described above.

Thus, other nonlinearities associated with transducers can be compensated for by using the above described techniques such as hysteresis and deformation. For example, hysteresis is a deviation which is provided in a mechanical system by the failure of the transducer for example, to return exactly to its quiescent state after the removal of a given pressure. Essentially, hysteresis is relatively insignificant in overall transducer preformance due to the fact that the error provided by hysteresis is extremely small. However, as described above, in such a system the last known pressure as stored in module 43 for example, is stored in memory and one therefore always knows what pressure the transducer was last subjected to. One can thence determine and store in a memory location, the effects of hysteresis based on applied pressure and in accordance with the particular size or thickness of the diaphragm upon which the bridge configuration is mounted. Hence, by accessing these memory locations, one could also provide an offset value to be added or subtracted as indicated above, to compensate for hysteresis.

Other considerations and embodiments should become apparent to those skilled in the art upon reading the above specification and are deemed to be encompassed within the spirit and scope of the following claims.

I claim:

1. A pressure transducer of the type employing semiconductor sensor elements capable of providing a change in resistance according to the magnitude of an applied pressure, said elements when biased, undesirably providing specified error voltages due to variations inherent in said elements as fabricated with a first error voltage indicative of errors due to a predetermined temperature change, a second error voltage due to changes by a reference pressure applied over a given temperature range, and a third error voltage due to a linear incremental pressure level applied to said elements over a predetermined pressure range, comprising:
   (a) memory means having stored at predetermined address locations values indicative of said undesired error voltages,
   (b) means coupled to said semiconductor elements and responsive to the temperature of operation for generating a code indicative of one of said predetermined memory address locations,
   (c) means for applying said code to said memory to access a value indicative of each of said undesired error voltages,
   (d) means for applying a pressure to said semiconductor sensor elements to cause the same to provide a change in resistance according to said pressure, including means coupled to said sensor elements to provide a signal indicative of said pressure,
   (e) logic means responsive to said signal and said value indicative of each of said error voltages to compensate said signal sequentially according to the magnitude of each of said values as stored to provide at an output, a compensated signal indicative of said applied pressure and relatively independent of each of said error voltages.

2. The pressure transducer according to claim 1 wherein said logic means includes algorithmic processing circuitry adapted to operate on said error signal to compensate said sensor signal according to the value of said algorithm as processed.

3. The pressure transducer according to claim 2 wherein said algorithmic processor is adapted to solve the relationship:

$$Y = AP + BP^2$$

where
Y = V OUT voltage of sensor elements
A = constant associated with said elements
B = another constant associated with said elements
P = Pressure.

4. The pressure transducer according to claim 1 wherein said means for generating a code includes temperature responsive means for monitoring the operating temperature of said sensor elements to generate said code according to said temperature.

5. The pressure transducer according to claim 1 further including display means coupled to said logic means and operative to provide a display indicative of said compensated signal.

6. In apparatus for providing an output signal indicative of an applied pressure, said apparatus including a semiconductor bridge circuit including sensor elements which provide a change in resistance according to the magnitude of an applied pressure, said bridge circuit when biased by a reference voltage source, providing a voltage at an output according to said applied pressure, which voltage undesireably includes at least a first error signal due to variations in operating temperature, a second error signal due to variations in pressure offset, the combination therewith of apparatus for providing an output signal indicative of said applied pressure and compensated according to said error signals, comprising:
 (a) memory means having a plurality of storage locations, a first location having stored therein values indicative of said first error signal according to temperature, at least a second location having stored therein values indicative of pressure offset,
 (b) temperature sensing means responsive to the temperature at which said bridge circuit is operating to provide a signal indicative of the same,
 (c) a selectable cycle generator coupled to said memory means and said temperature sensing means, for providing at an output, a first code capable of selecting said first location and a second code capable of selecting said second location,
 (d) selection means coupled to said memory means and responsive to said first code to provide at an output, a signal indicative of said first error signal during a first cycle and responsive to said second code to provide an output signal indicative of said values of pressure offset during a second cycle,
 (e) means responsive to said voltage from said bridge and said signal indicative of said first error signal to provide a signal indicative of said bridge voltage compensated according to said first error signal, and means responsive to said bridge voltage and said pressure offset signal to provide an output signal indicative of said bridge voltage compensated according to said first error signal and said pressure offset signal.

7. The apparatus according to claim 6 further comprising:
 (a) a third memory location having stored therein values indicative of an error signal due to incremental pressure variations over a predetermined pressure range,
 (b) means included in said selectable cycle generator to provide a third code capable of selecting said third locations,
 (c) means included in said selection means and responsive to said third code to provide at an output, a weighted signal indicative of said incremental pressure variations,
 (d) logic means responsive to said output signal and said weighted signal to provide a further output signal compensated according to said first error signal, said pressure offset signal and said pressure increment signal.

8. The apparatus according to claim 7 wherein said temperature sensing means includes a resistor in series with said bridge circuit and said reference source and means for monitoring the voltage across said resistor to provide at an output, a signal indicative of temperature.

9. The apparatus according to claim 8 wherein said logic means is adapted to solve the relationship:

$$Y = AP + BP^2$$

where
Y = said output signal
A & B = said weighted signal as stored
P = said further output signal.

10. A method of compensating a pressure sensor bridge array according to predetermined error voltages contained in the output of said array, comprising the steps of:
 (a) storing in memory at predetermined address locations, values indicative of said error voltages, with first values indicative of error voltages of said array over a predetermined temperature range, with second values indicative of error voltages due to incremental pressure variations over a predetermined range,
 (b) applying a pressure to said bridge array,
 (c) measuring and storing the output of said bridge array when said pressure is applied,
 (d) measuring the temperature at which said array is operating,
 (e) providing a code indicative of said temperature of operation,
 (f) sequentially accessing said memory with said code at selected ones of said address locations to retrieve values indicative of said error voltages,
 (g) processing said stored output of said bridge array with respect to said retrieved error voltages to provide a first signal indicative of said pressure relatively independent of said error voltage,
 (h) processing said first signal according to $Y = AP + BP^2$, where Y = output signal of said bridge array, A = constant stored in memory, B = constant stored in memory and P = pressure indicative of said first signal, and
 (i) displaying said signal.

* * * * *